BLANKING CIRCUITS FOR TELEVISION RECEIVERS

Filed May 19, 1966

INVENTOR.
GEORGE E. ANDERSON
BY Eugene M. Whitacre
Attorney

United States Patent Office 3,392,306

Patented July 9, 1968

3,392,306
BLANKING CIRCUITS FOR TELEVISION RECEIVERS

George E. Anderson, Indianapolis, Ind., assignor to Radio Corporation of America, a corporation of Delaware Filed May 19, 1966, Ser. No. 551,336
4 Claims. (Cl. 315—22)

This invention relates to television receivers, and in particular to vertical retrace blanking circuits for use in television receivers.

Blanking circuits are employed to turn off or blank a deflection beam of a television receiver kinescope during retrace periods of the beam. If the deflection beam is not suppressed during its vertical retrace movement, vertical retrace lines will appear on the screen of the kinescope. These lines appear as white or colored diagonal lines across the raster. To minimize the possibility of retrace lines appearing, it has been the practice in the past to employ retrace suppression, utilizing the flyback pulses from the vertical deflection circuit as suppression pulses. In the vertical deflection circuit a composite voltage is produced having a sawtooth (scan) component and a pulse (flyback) component.

Accordingly, it is an object of the present invention to provide an improved circuit for obtaining vertical retrace blanking of the picture tube of a color television receiver.

In accordance with the invention, vertical retrace blanking is provided in a television receiver by connecting a rectifier in series with the load impedance of the video amplifier stage of the receiver. The rectifier is poled so as to be forward biased by the amplifier stage operating potential source. A blanking pulse signal occurring during the retrace intervale of the vertical deflection cycle is applied across the rectifier in a polarity to reverse bias said rectifier during the retrace interval and cause said pulse signal to be superimposed on a video signal developed across the load impedance for blanking of the receiver picture tube.

The novel features that are considered characteristic of this invention are set forth with particularity in the appended claims. The invention itself however, both as to its organization and method of operation will best be understood when read in connection with the accompanying drawing in which:

Figure 1:
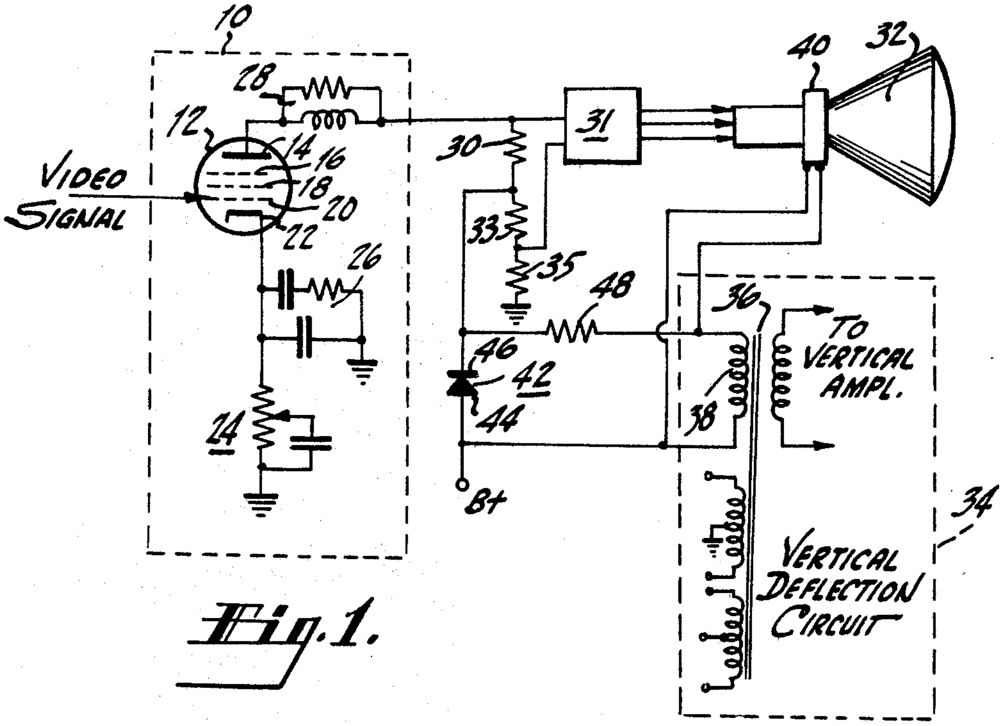
FIGURE 1 is a simplified schematic circuit diagram of a portion of a television receiver including a blanking circuit embodying the present invention.

Referring now to the drawing, and in particular to FIGURE 1, a video amplifier stage which may comprise the luminance output stage of a color television receiver is shown in simplified form within the dashed rectangle 10. The output stage may include a pentode tube 12 having plate, suppressor, screen, control grid and cathode electrodes 14, 16, 18, 20 and 22 respectively. A video signal derived from a preceding amplifier stage (not shown) is applied to the control grid 20. The cathode electrode 22 is coupled through a contrast control network 24 to ground. Connection is also made from the cathode electrode 22 through a video peaking network 26 to ground. Another video peaking network 28 is connected between the plate electrode 14 and a plate load resistor 30. The junction of the peaking network 28 and resistor 30 is connected to a coupling network 31, which in turn is connected to the cathode electrodes (not shown) of a color picture tube or kinescope 32. The coupling network 31 may include the usual drive controls for setting the bias on the various electron guns of the kinescope, as well as additional video peaking elements and video peaking control circuitry. The direct voltage developed at the junction of resistors 33 and 35 is applied to the drive control circuitry in the coupling circuit 31 so that the various drive control potentiometers, not shown, are effectively in parallel with the resistors 30 and 33.

The receiver vertical deflection circuit 34 includes a vertical output transformer 36 driven by a vertical amplifier (not shown) for developing across its secondary winding 38 a vertical deflection waveform having a sawtooth portion during a relatively long scanning interval and a flyback pulse portion during a relatively short retrace interval. As shown in FIGURE 1, the deflection waveform developed across the secondary winding 38 is coupled to the vertical windings (not shown) of a deflection yoke 40 which surrounds the neck of the picture tube 32.

In accordance with the present invention, the plate circuit of the video output stage 10 includes a rectifier 42 in series with the plate load resistor 30 and tube operating positive potential source B+. The rectifier 42 is poled such that it is forward biased by the operating potential B+ during the scanning interval of the vertical deflection waveform. Thus, the rectifier anode electrode 44 is connected to the positive operating potential B+ and the rectifier cathode electrode 46 is connected to one end of the resistor 30. Connection is also made from one end of the vertical output transformer secondary winding 38 in series with a resistor 48 to the cathode electrode 46 of the rectifier 42. The other end of secondary winding 38 is connected to the source of operating potential B+. The connections from the secondary winding to the resistor 48 and operating potential B+ are such that the flyback pulse portion of the deflection waveform developed across the winding 38 is of a polarity to add to the operating potential B+. The resistor 48 is inserted in the circuit to limit loading of the transformer secondary winding 38 by the rectifier 42 during the scan portion of the deflection waveform.

The operation of the blanking circuit will now be described. During the scan interval, the polarity of the deflection waveform (with respect to the operating potential B+) is such as to cause the rectifier to present negligible impedance thereto. During this interval the video output stage functions in the normal manner, developing a video signal across the load impedance for application to the cathode electrodes of the kinescope to effect a visual display of the information contained therein. During the retrace interval, the polarity of the deflection waveform pulse portion (with respect to the operating potential B+) is such as to reverse bias the rectifier and cause the flyback pulse to be developed thereacross for application to the cathode electrodes (not shown) of the picture tube 32. The pulse is coupled through the load resistor 30 to the cathode electrodes of the picture tube where it additively combines with and reinforces vertical sync pulse portion of the composite video signal to effect blanking of the picture tube 32 during the retrace interval. Thus the flyback pulse is superimposed on the vertical sync pulse portion of the composite video signal and raises it to a level corresponding to a "blacker than black" modulation voltage, so as to provide complete blanking of the picture tube during the vertical retrace interval.

Figure 2:
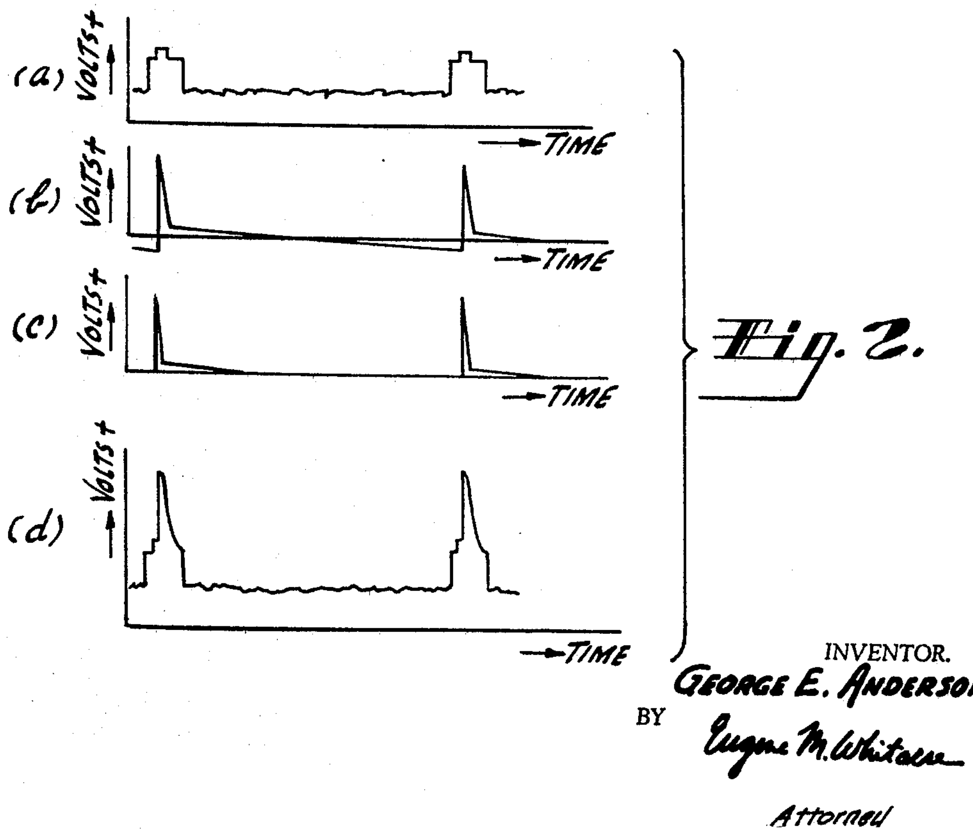
FIGURE 2 is a graph illustrating waveforms useful in explaining the operation of the blanking circuit shown in FIGURE 1.

Operation of the above described embodiment is illustrated in FIGURE 2 wherein the waveforms appearing at successive portions of the circuit of FIGURE 1 are shown. In FIGURE 2*a* the composite video signal applied to the cathode electrodes of the picture tube is illustrated. For simplicity, the equalizing and horizontal sync pulses occuring during the vertical retrace interval, as well as the horizontal sync pulses occurring during the scanning interval, have been omitted. FIGURE 2*b* illustrates the vertical deflection waveform developed across the secondary winding of the vertical output transformer. FIGURE 2*c* illustrates the flyback pulse portion of the vertical deflection waveform developed across the rectifier and applied to the cathode electrodes of the picture tube. The rectifier has in effect clipped the sawtooth portion of the vertical deflection waveform. This prevents unwanted sawtooth waveforms from being applied to the picture tube and shading of the displayed image during the scan interval. FIGURE 2*d* shows the total voltage applied to the cathode electrodes of the picture tube and comprises the video signal as enhanced by the addition of the flyback pulse. Since the flyback pulse is in coincidence with the retrace portion of the vertical deflection waveform applied to the vertical windings in the yoke, blanking must occur during this retrace time. From a further inspection of FIGURE 2*d* it will be noted that the pulse portion of the waveform shows a slight curvature which extends out past the end of the vertical sync pulse interval. This curvature provides additional blanking voltage to insure complete retrace blanking during the retrace interval and is believed to be due to a slight integration of the flyback pulse portion of the deflection waveform.

It should be noted, that a feature of the invention is that the secondary winding of the vertical output transformer is "floating" and may be tied to any potential (not exceeding its rating). It has been found that by connecting the secondary winding to B+, as in the blanking circuit shown, the vertical interlace of the receiver is also improved by providing a low impedance path for yoke crosstalk. It should also be noted that instead of utilizing the secondary and yoke driving winding of the vertical output transformer as a source for obtaining the additional blanking pulse, an auxiliary or tertiary winding of the transformer could be used.

What is claimed is:

1. A blanking circuit for a television receiver having a video amplifier stage coupled to a television picture tube, said amplifier stage including a source of operating potential and a load impedance across which a video signal is developed, and vertical deflection waveform generating apparatus for producing a deflection waveform having a relatively long scanning interval and a relatively short retrace interval, comprising in combination:
   means coupled to said generating apparatus for deriving a pulse signal during the retrace interval of said deflection waveform;
   a rectifier connected in series with said impedance means and said operating potential source, said rectifier being poled so to to be forward biased by said operating potential source;
   means for applying said pulse signal across said rectifier for reverse biasing said rectifier during the retrace interval of said deflection waveform and causing said pulse signal to be superimposed on said video signal for blanking of said television picture tube.

2. A blanking circuit as defined in claim 1 wherein said source of operating potential is positive with respect to a reference potential and said pulse signal deriving means includes a transformer having a secondary winding one end of which is connected to said source of operating potential and wherein said pulse signal applying means includes a resistor series connected between the other end of said secondary winding and the junction of said rectifier and impedance means, the pulse signal derived by said pulse signal deriving means being of a positive polarity with respect to said operating potential.

3. A blanking circuit for a color television receiver having a video amplifier stage coupled to the cathode electrodes of a color picture tube, and vertical deflection waveform generating apparatus for producing a deflection waveform having a relatively long scanning interval and a relatively short retrace interval, comprising in combination:
   means coupled to said generating apparatus for deriving a pulse signal during the retrace interval of said deflection waveform;
   a rectifier having cathode and anode electrodes;
   impedance means coupled between the cathode of said rectifier and the cathode electrodes of said picture tube;
   a source of positive potential connected to the anode of said rectifier; and
   means for applying said pulse signal across said rectifier for reverse biasing said rectifier during the retrace interval of said deflection waveform and causing said pulse signal to be coupled to said picture tube cathode electrodes for blanking of said picture tube during the retrace interval.

4. A blanking circuit as defined in claim 3 wherein said pulse signal deriving means includes a transformer having a secondary winding one end of which is connected to said positive potential source, and wherein said pulse signal applying means includes a resistor series connected between the other end of said secondary winding and the cathode electrode of said rectifier, the pulse signal derived by said pulse signal deriving means being of a positive polarity with respect to said operating potential.

References Cited

UNITED STATES PATENTS 2,560,815 7/1951 Oliver -------------- 315—22

RODNEY D. BENNETT, *Primary Examiner.*

T. H. TUBBESING, *Assistant Examiner.*